United States Patent
Nihei et al.

(10) Patent No.: US 7,419,351 B2
(45) Date of Patent: Sep. 2, 2008

(54) MANAGING STRUCTURE FOR UMBILICAL MEMBER OF INDUSTRIAL ROBOT

(75) Inventors: Ryo Nihei, Fujiyoshida (JP); Toshihiko Inoue, Fujiyoshida (JP); Kazutaka Nakayama, Minamitsuru-gun (JP)

(73) Assignee: Fanuc Ltd, Minamitsuru-gun, Yamanashi (JP)

( * ) Notice: Subject to any disclaimer, the term of this patent is extended or adjusted under 35 U.S.C. 154(b) by 102 days.

(21) Appl. No.: 11/131,202

(22) Filed: May 18, 2005

(65) Prior Publication Data

US 2005/0281660 A1 Dec. 22, 2005

(30) Foreign Application Priority Data

May 21, 2004 (JP) ............................. 2004-152070

(51) Int. Cl.
  *B25J 17/02* (2006.01)
(52) U.S. Cl. ..................................... 414/735
(58) Field of Classification Search ............... 414/735, 414/918; 74/490.02, 490.05, 490.06; 901/28, 901/29, 15; 174/40 R; 248/226.12
See application file for complete search history.

(56) References Cited

U.S. PATENT DOCUMENTS

| 2,699,462 | A | * | 1/1955 | Exner | ...................... | 174/140 R |
| 4,529,352 | A | * | 7/1985 | Suzuki et al. | ................ | 414/680 |
| D346,546 | S | * | 5/1994 | Tesmar, Jr. | ................... | D8/356 |
| 7,069,808 | B2 | * | 7/2006 | Uematsu et al. | .......... | 74/490.02 |

FOREIGN PATENT DOCUMENTS

| DE | 92 17 659.3 | 12/1992 |
| DE | 202 03 095 U1 | 2/2002 |
| JP | 61-122071 | 8/1986 |
| JP | 64-054976 | 4/1989 |
| JP | 09-216189 | 8/1997 |
| JP | 2001-260069 | 9/2001 |
| JP | 2003-094168 | 4/2003 |

* cited by examiner

*Primary Examiner*—Donald Underwood
(74) *Attorney, Agent, or Firm*—Drinker Biddle & Reath LLP

(57) ABSTRACT

A managing structure for an umbilical member of an industrial robot, the umbilical member being for supplying air and electric energy to a work tool attached to an end of a wrist of the robot, in which the umbilical member is properly moved and interference between the umbilical member and a peripheral object or a forearm of the robot is prevented. The umbilical member elastically contacts a guide surface of a guide plate attached to a second wrist element of the robot without widely projecting from the robot. The umbilical member is guided such that the extending direction of the umbilical member generally coincides with the longitudinal direction of the guide plate before the umbilical member is connected to the work tool. The thickness of the guide plate may be gradually reduced or constant toward a free end of the guide plate. The rotational motion about a third axis of the work tool by a final axis of the robot is converted to the rotational motion about a fourth axis via a transmission, so as to rotate the work tool. Even when the work tool is rotated, the umbilical member is properly moved. The work tool may also be rotated about the third axis.

5 Claims, 8 Drawing Sheets

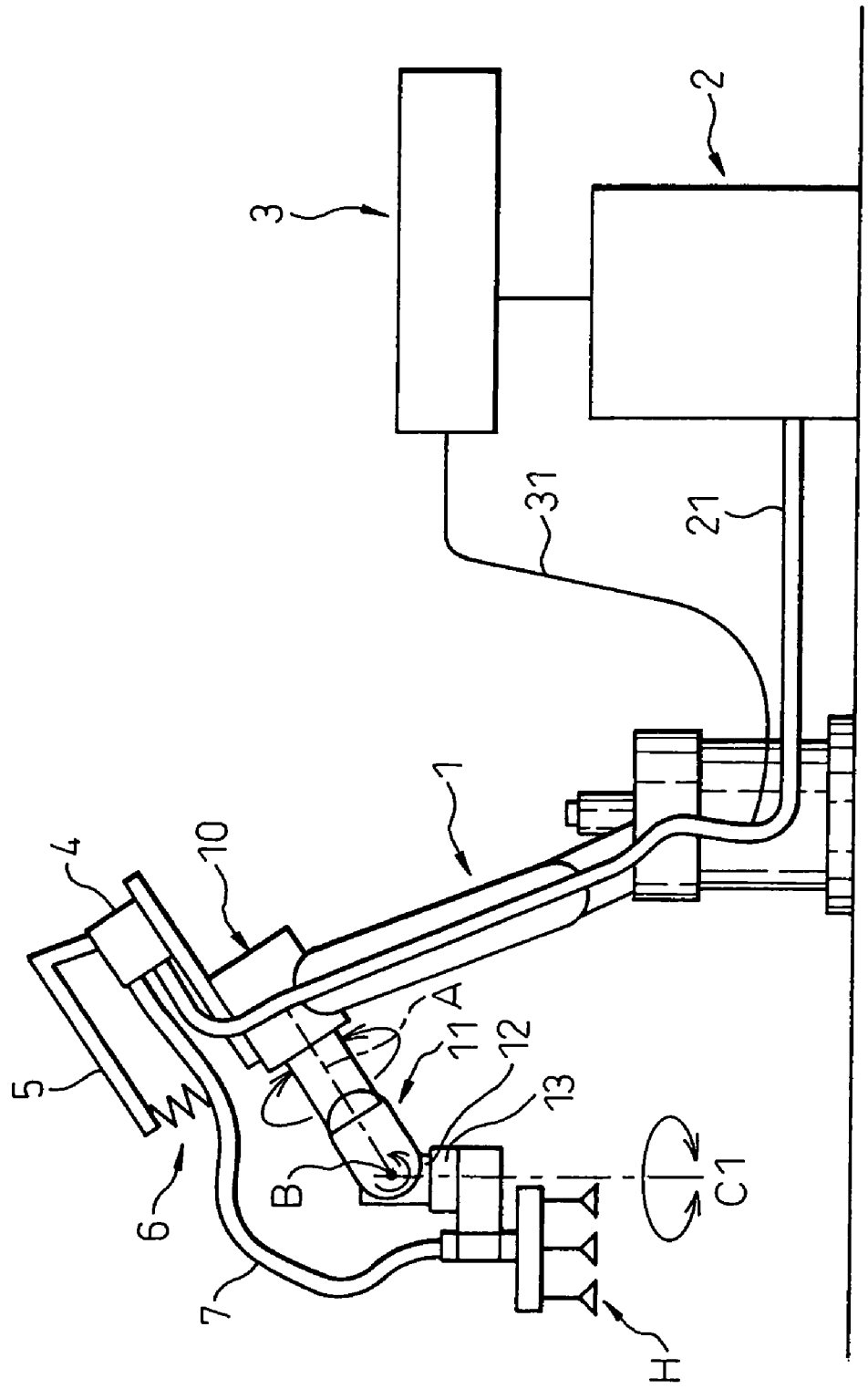

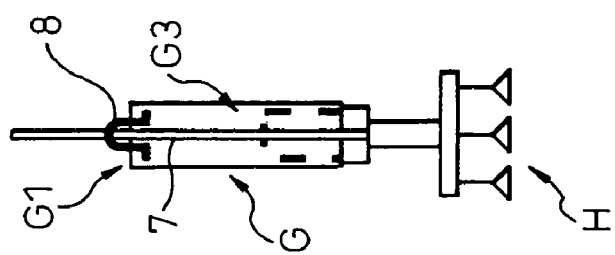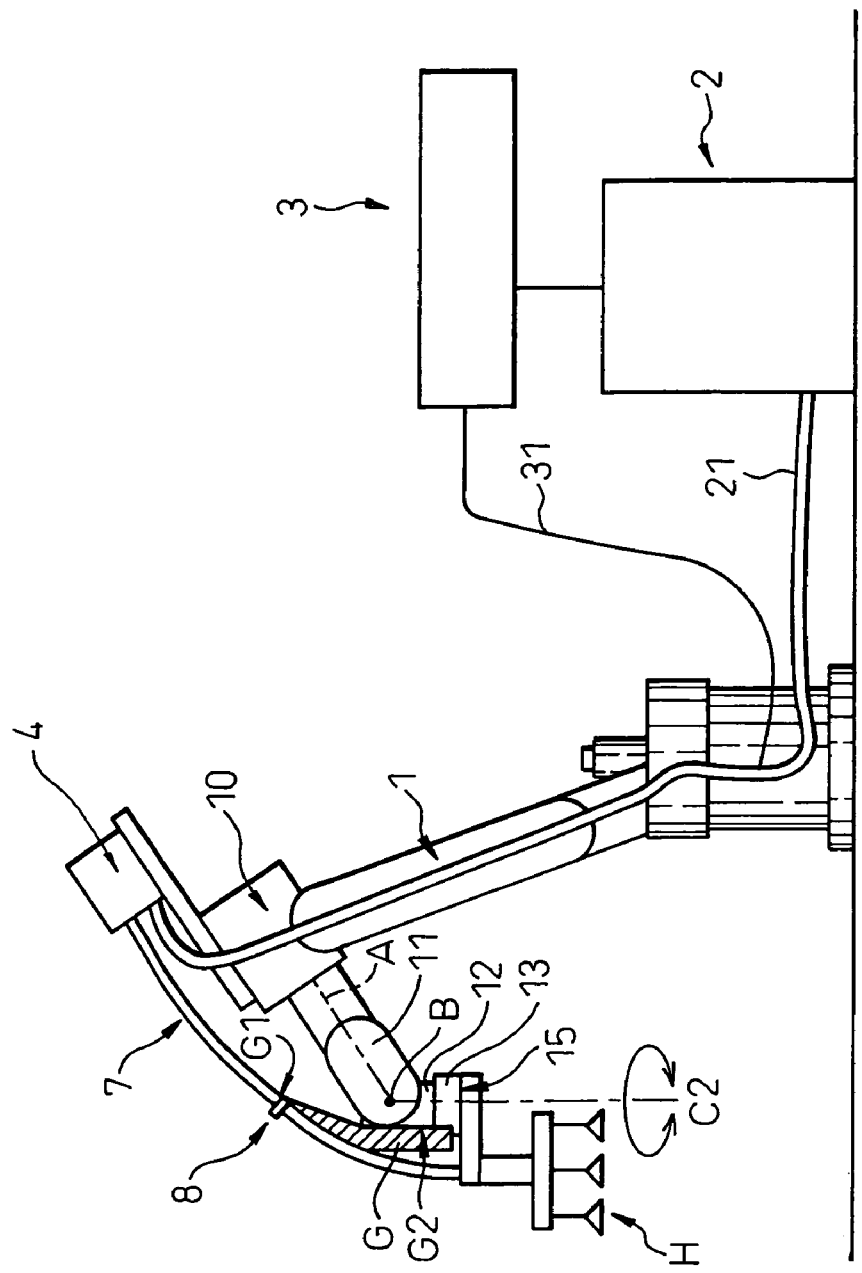

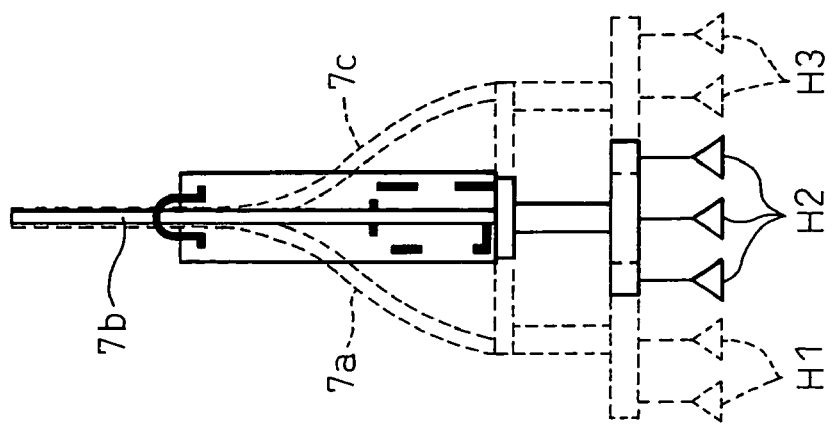
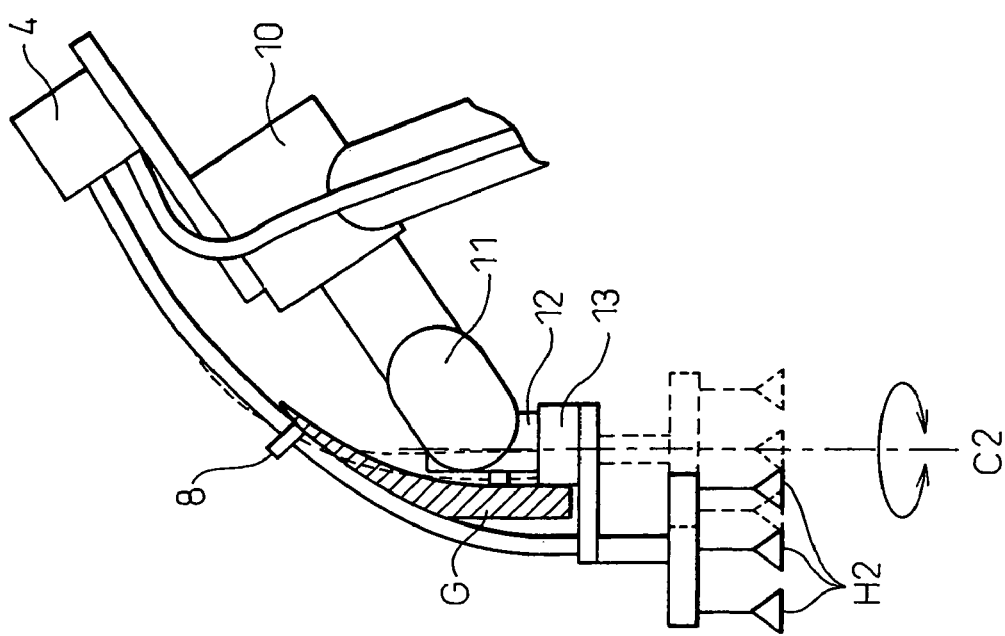

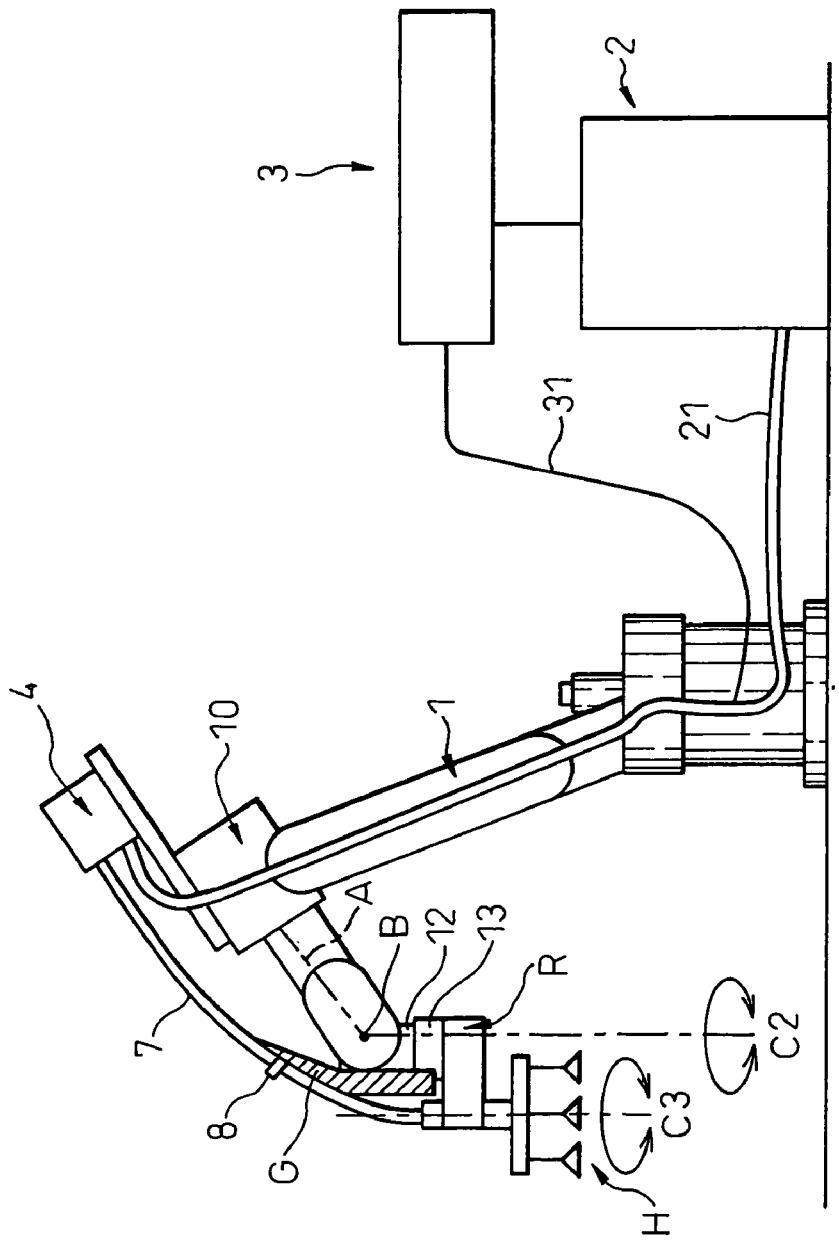

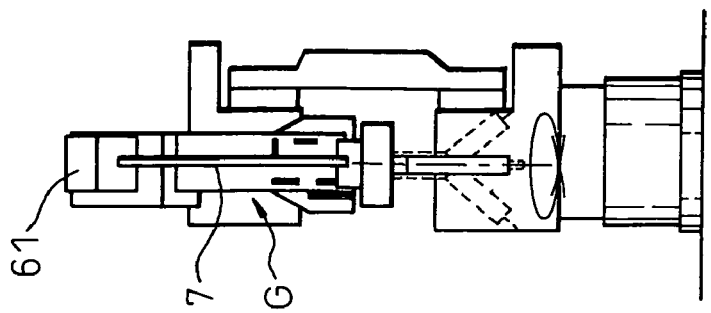
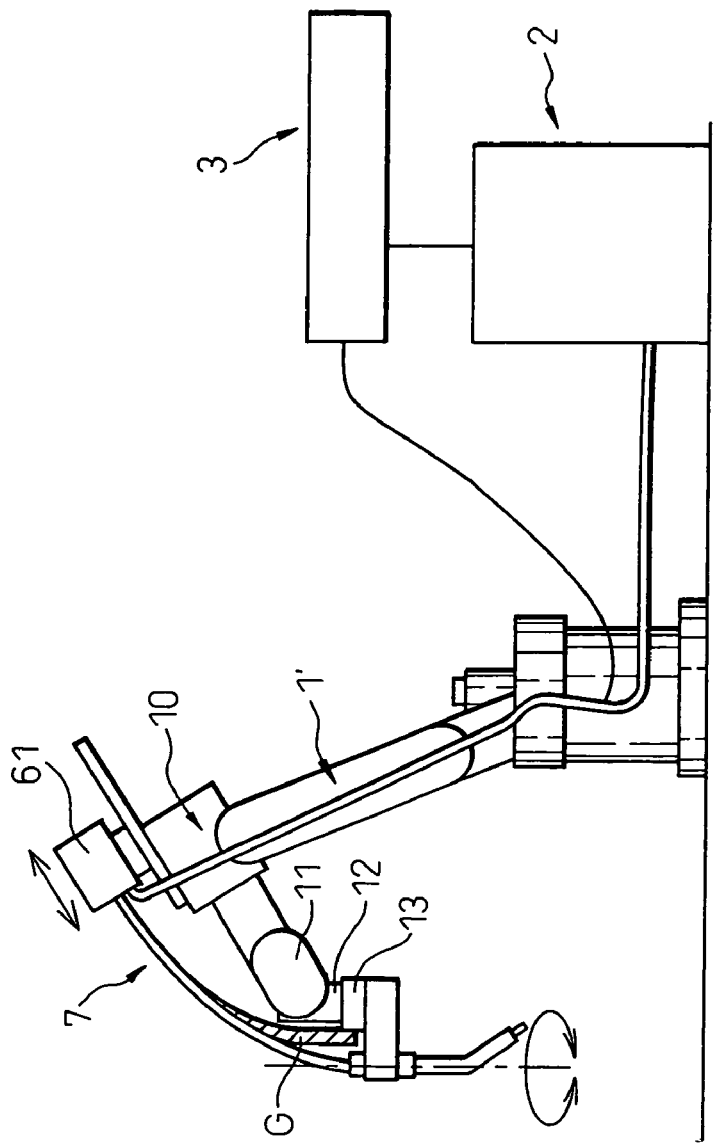

MANAGING STRUCTURE FOR UMBILICAL MEMBER OF INDUSTRIAL ROBOT

BACKGROUND ART

1. Technical Field

The preset invention relates to a managing structure for an umbilical member of an industrial robot.

2. Description of the Related Art

In an industrial robot (hereinafter referred to simply as a robot), a work tool is attached to an end of a wrist of the robot. In many cases, an umbilical member for the work tool (a cable and/or a tube; hereinafter referred to simply as umbilical member) for supplying material, energy or a signal (for example, air, electric energy, light energy or an electric signal) is arranged over a forearm of the robot and is connected to the work tool. Such an example of prior art is shown in FIG. 1.

In FIG. 1, numeral 1 denotes a robot controlled by a robot controller 2. A first wrist element 11 is mounted to a forearm 10 of the robot 1 and is rotatable about a first axis A extending in the longitudinal direction of the forearm. A second wrist element 12 is mounted to the first wrist element 11 and is rotatable about a second axis B generally perpendicular to the first axis A. Further, a third wrist element 13 is mounted to the second wrist element 12 and is rotatable about a third axis C1 generally perpendicular to the second axis B. A work tool H is attached to an end flange of the third wrist element 13. In this case, the work tool is a hand having suckers. Numeral 3 denotes an air delivery/suction device. An air tube 31 connected to the device 3 is joined in place to a cable 21 for supplying a power and an electric signal to the robot and is connected to a solenoid valve box 4. Delivery and suction of air between the solenoid valve box 4 and the hand H may be carried out by means of a tube (an umbilical member) 7. The robot controller 2 controls the air delivery/suction device 3 and the solenoid valve box 4 in a known manner, thereby delivery (grip-OFF) and suction (grip-ON) of air to and from the suckers of the hand H may be alternately changed.

In this case, disadvantageously, due to the rotation about each of the axes A, B and C1 by the motion of the robot, the umbilical member 7 may contact the forearm 10, may twine about the wrist elements 11 or 12, and/or may be strongly pulled. In order to avoid these disadvantages, in prior art, the umbilical member 7 has been widely outwardly projected before connected to the hand H, as shown in FIG. 1.

However, when the umbilical member 7 is widely outwardly projected, the action of the umbilical member 7 may be unstable when the wrist axis of the robot is activated. As a result, the umbilical member 7 may contact or interfere with a peripheral equipment and damage the equipment or the umbilical member itself. Another structure, in which an L-shape member 5 and an elastic body 6 are used so as to hang the umbilical member 7 above the forearm 10 and to limit the movement of the umbilical member, may be possible. However, the structure has in sufficient effect to avoid the interference.

SUMMARY OF THE INVENTION

Accordingly, an object of the present invention is to resolve the above problems. In other words, the object of the invention is to provide a managing structure for a umbilical member, by which the umbilical member, for supplying air or electric power to the work tool attached to the end of the wrist of the robot, may be arranged, without widely outwardly projecting, and interference between the umbilical member and the forearm may be avoided.

In order to resolve the above problems, in the present invention, a guide plate for guiding the umbilical member by a front surface of the guide plate is arranged on the second wrist element. The guide plate has a free end on one side of the plate away from the work tool and is formed from a flexible material having a thickness gradually reducing toward the free end.

Concretely, according to one embodiment of the present invention, there is provided a managing structure for an umbilical member of an industrial robot, the robot having: a forearm; a first wrist element mounted to the forearm and rotatable about a first axis extending in the longitudinal direction of the forearm; a second wrist element mounted to the first wrist element and rotatable about a second axis generally perpendicular to the first axis; a third wrist element mounted to the second wrist element and rotatable about a third axis generally perpendicular to the second axis; and a work tool configured to move integrally with the third wrist element, the umbilical member being connected to the work tool, wherein the managing structure comprising: a guide plate arranged on the second wrist element, the guide plate comprising: a width extending generally parallel to the second axis; a free end on one side of the guide plate away from the work tool, the free end extending along the longitudinal direction perpendicular to the direction of the width; a flexible portion extending toward the free end; and a guide surface for contacting and guiding the umbilical member such that the extending direction of the umbilical member generally coincides to the longitudinal direction of the guide plate before the umbilical member extending from a base of the forearm is connected to the work tool.

According to another embodiment of the present invention, there is provided a managing structure for an umbilical member of an industrial robot, the robot having: a forearm; a first wrist element mounted to the forearm and rotatable about a first axis extending in the longitudinal direction of the forearm; a second wrist element mounted to the first wrist element and rotatable about a second axis generally perpendicular to the first axis; a third wrist element mounted to the second wrist element and rotatable about a third axis generally perpendicular to the second axis; and a work tool attached to the third wrist element via a transmission for converting a rotational motion of the third wrist element about the third axis to a rotational motion of the work tool about a fourth axis which is generally perpendicular to the second axis and is different from the third axis, the umbilical member being connected to the work tool, wherein the managing structure comprises: a guide plate arranged on the second wrist element, the guide plate comprising: a width extending generally parallel to the second axis; a free end on one side of the guide plate away from the work tool, the free end extending along the longitudinal direction perpendicular to the direction of the width; a flexible portion extending toward the free end; and a guide surface for contacting and guiding the umbilical member such that the extending direction of the umbilical member generally coincides to the longitudinal direction of the guide plate before the umbilical member extending from a base of the forearm is connected to the work tool.

The flexible portion of the guide plate may have a thickness gradually reducing forward the free end. Alternatively, the flexible portion may have a constant thickness toward the free end.

In both of the embodiments the guide surface of the guide plate may preferably have a low friction by using Teflon (TM), for example, as material of the guide plate. Due to the low friction of the guide surface of the guide plate, the umbilical member may move smoothly on the guide surface.

The guide plate may preferably have a concave guide surface on at least a part along the longitudinal direction of the guide plate. By using such a guide plate, the umbilical member is easily held on the guide plate.

BRIEF DESCRIPTION OF THE DRAWINGS

The above and other objects, features and advantages of the present invention will be made more apparent by the following description of the preferred embodiments thereof, with reference to the accompanying drawings, wherein:

FIG. 1 is a front view showing a total configuration of an industrial robot including a managing structure for an umbilical member of prior art;

FIGS. 2a and 2b are a front view showing a total configuration of an industrial robot including a managing structure for an umbilical member of a first embodiment of the invention and a right-side view showing around a wrist of the robot, respectively;

FIGS. 3a and 3b are a front view of the robot partly omitted and a right-side view around the wrist of the robot, respectively, both showing the motion of the umbilical member when a third wrist element of the first embodiment is widely rotated;

FIGS. 4a and 4b are a front view showing a total configuration of an industrial robot including a managing structure for an umbilical member of a second embodiment of the invention and a right-side view showing around a wrist of the robot, respectively;

FIGS. 7a and 7b are a front view and a side view showing an example of an arc welding robot including a managing structure for an umbilical member of the invention.

DETAILED DESCRIPTION

Figure 2C:
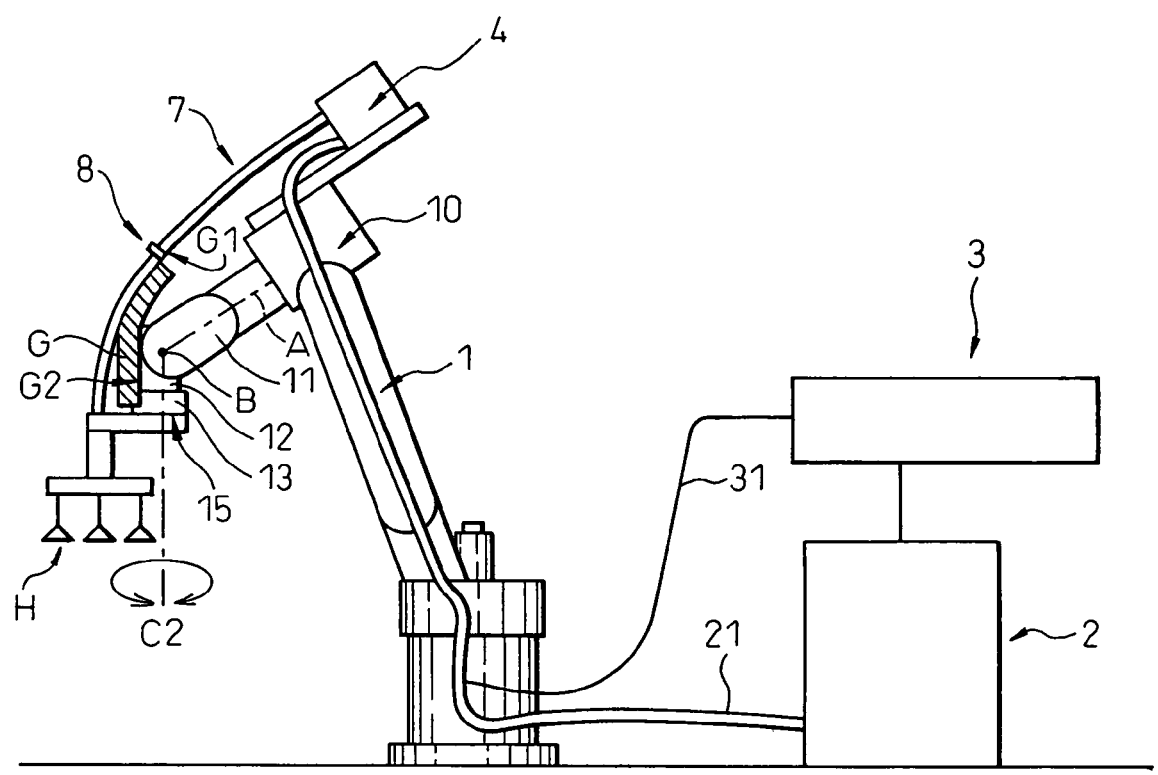
FIG. 2c is a view similar to FIG. 2a, showing an alternative configuration of a guide plate of the managing structure.

Embodiments of the invention will be described with reference to FIGS. 2a-6b. Although a handling robot system is assumed as an application, this is merely an illustration. FIG. 2a is a front view showing a total configuration of an industrial robot including a managing structure for an umbilical member of a first embodiment of the invention. Also, FIG. 2b is a right-side view showing around a wrist of the robot.

As shown in FIGS. 2a and 2b, numeral 1 denotes a handling robot of six degree-of-freedom controlled by a robot controller 2. The robot 1 has a forearm 10 and, a first wrist element 11 is mounted to the forearm 10 and is rotatable about a first axis A extending in the longitudinal direction of the forearm. A second wrist element 12 is mounted to the first wrist element 11 and is rotatable about a second axis B generally perpendicular to the first axis A. Further, a third wrist element 13 is mounted to the second wrist element 12 and is rotatable about a third axis C2 generally perpendicular to the second axis B. A work tool H, which is a hand having suckers in this case, is attached to a mounting surface (a flange face) 15 at the end of the third wrist element 13.

Numeral 3 denotes an external air delivery/suction device. An air tube 31 connected to the device 3 is joined in place to a cable 21 for supplying a power and an electric signal to the robot and is connected to a solenoid valve box 4. Delivery and suction of air between the solenoid valve box 4 and the hand H may be carried out by means of a tube or an umbilical member 7. The robot controller 2 may control the air delivery/suction device 3 and the solenoid valve box 4 in a known manner, thereby and delivery and suction of air to and from the suckers of the hand H (attraction-OFF and -ON) may be alternately changed.

The robot controller 2 controls each servomotor for driving each axis of the robot 1 such that the servomotor is operated according to a command based on a program or the like. Also, the robot controller 2 controls the hand H such that the hand H is properly moved and orientated for sucking an object (not shown) to be handled. Further, the robot controller 2 outputs a suction command and a suction-release command for the hand H, as well as an action command for the robot, and a command for controlling the air delivery/suction device 3 and a solenoid valve within the solenoid valve box 4. As such a handling operation itself is known, a detailed description of the operation is omitted herein. The robot 1 suitably changes the orientation of the arm corresponding to a handling position and controls the position and the orientation of the hand H so as to carry out the handling operation. Of course, the hand H may be connected to a signal line for confirming the existence of the object. In this case, the signal line may be included in the umbilical member 7. Further, in such a case in which a plurality kind of substances such as material, energy and a signal are supplied to the work tool, the umbilical member 7 may presents a plurality of bundled cables or hoses, or, one composite cable or hose including a plurality of cables or hoses.

When the orientation of the robot arm is changed, a motion is performed in which all or a part of rotations of the first wrist element 11 about the first axis A, the second wrist element 12 about the second axis B and the third wrist element 13 about the third axis C2 are diversely combined. As described above, it is important to manage the umbilical member 7 extending from the base of the forearm 10 to the work tool H. In the present invention, a guide plate is used, having a guide surface for contacting and guiding the umbilical member 7 such that the extending direction of the umbilical member 7 generally coincides to the longitudinal direction of the guide plate before the umbilical member 7 is connected to the work tool H.

As shown in FIGS. 2a and 2b, a guide plate denoted by numeral G is attached to a side of the second wrist element 12 by a suitable means (a screw or an adhesive). An attached portion G2 of the guide plate G is near an end of the guide plate close to the work tool H. The guide G is formed from a flexible material and has a width parallel to the second axis B. Also, the guide plate G extends away from the work tool H along the longitudinal direction generally parallel to the third axis C2 and terminates at a free end G1. The thickness of the guide plate G gradually reduces from a suitable position (for example, at or near the attached portion G2) to the free end G1. However, as shown in FIG. 2c, the thickness of the guide plate G may be constant toward the free end G1. Also, in this case, the same effect as that of FIG. 2a may be obtained.

Figure 6A:
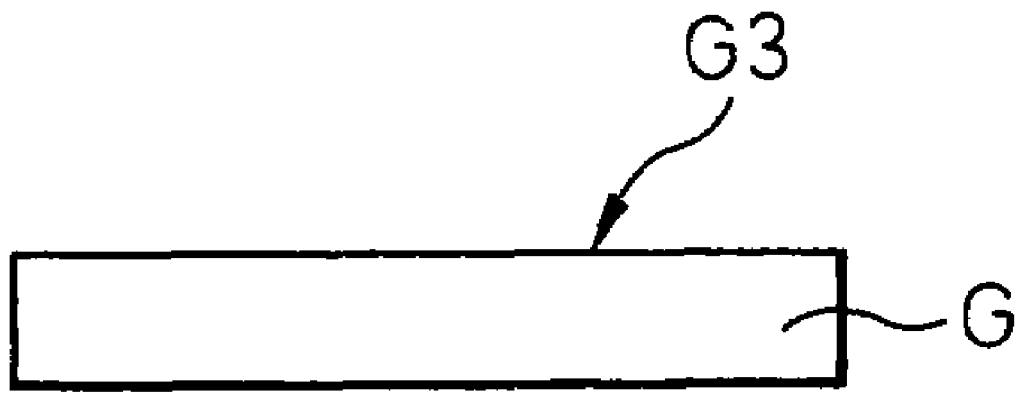
FIGS. 6a and 6b are sectional views of the guide plate having a flat guide surface and a concave guide surface, respectively.
Figure 6B:
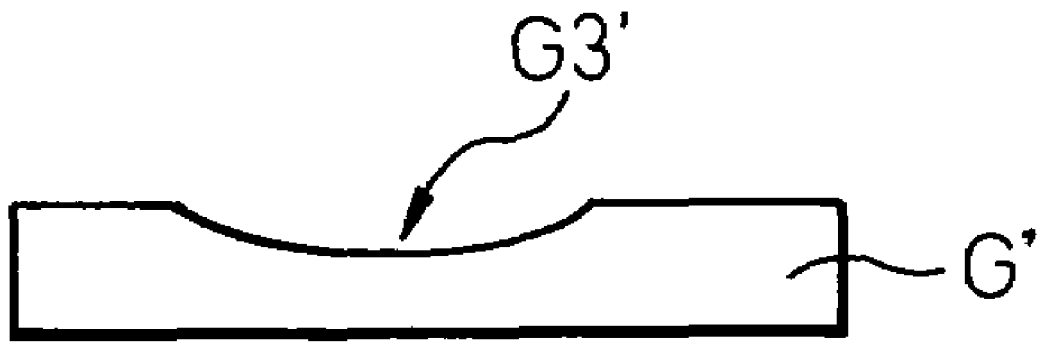

A front surface (i.e., a surface opposite to the second wrist element 12) of the guide plate G provides a guide surface G3 which contacts and guides the umbilical member 7. By the guide surface G3, the umbilical member 7, extending from the solenoid valve box 4 near the base of the forearm 10 to the work tool H, softly or elastically contacts the guide surface G3 near the free end G1 without widely projecting from the body of the robot 1. The umbilical member 7 then is guided along the longitudinal direction of the guide plate G and is connected to the work tool H. In addition, when the guide surface G3 has a low friction surface formed by a low friction material such as Teflon (TM), the umbilical member 7 may be smoothly moved on the guide surface G3. Further, when a clamp 8 for slidably and/or rotatably holding the umbilical member 7 on the guide plate G is arranged on an upper part (i.e., at or near the free end G1) of the guide plate G, the motion of the umbilical member may be more stable. Although the guide surface G3 of the guide plate G may be a flat surface as shown in FIG. 6a, a guide plate G' having a concave surface G3' generally at center of the guide plate G' may also be used, as shown in FIG. 6b, thereby a guide function in the width direction of the guide plate is provided. Such a concave surface may be configured on all or a part of the length of the guide plate along the longitudinal direction of the guide plate.

In the handling robot of the embodiment, the object is usually picked up from the above. Therefore, the orientations of the robot when the object is sucked and released are naturally determined. In other words, in a series of motions from the suction to the release of the object, the orientations of the first wrist element 11 are generally coincide with the orientations of a wrist element of a conventional robot and the orientations of the second wrist element 12 are rotated by approximately 90 degree from the orientations of the wrist element of the conventional robot such that the flange face 15 is directed to the bottom. Such orientations are commonly presented in other applications such as arc welding and sealing, as well as a handling operation.

On the other hand, the orientation of the third wrist element 13 driven by a final axis (or a sixth axis in this case) of the robot may be widely moved with rotation case by case. Such a wide movement may be suitably managed by the managing structure of the invention. FIGS. 3a and 3b are a front view of the robot partly omitted and a right-side view around the wrist of the robot, respectively, both showing the motion of the umbilical member when the third wrist element of the first embodiment is widely rotated.

When the final axis rotates, the hand H is rotated about the third axis C2. In this case, three possible rotational positions of the final axis are assumed and the robot positions corresponding to the rotational positions are referred as a first, a second and a third orientations, respectively. Numeral H1 illustrates a position of suckers at the first orientation. Similarly, numerals H2 and H3 illustrate positions of suckers at the second and third orientations, respectively. The second orientation corresponds to a normal orientation of the robot. When viewed from the above of the robot, the first and third orientations correspond to the second orientation clockwise and counter-clockwise rotated by approximately 90 degree, respectively.

At the second orientation, the umbilical member 7 is positioned behind the forearm 10 along the guide plate G (see numeral 7b). Even though the final axis moves to some extent, the umbilical member 7 is moved only on the guide plate G. Therefore, it is obvious that the umbilical member 7 may be suitably managed.

On the other hand, when the robot presents the first or the third orientation by wide movement of the final axis, a portion of the umbilical member 7 near the hand H is apart from the guide plate G in the width direction of the guide plate. However, another portion of the umbilical member 7 near the upper end (or the free end) of the guide plate is guided by the guide plate G (see numeral 7a or 7c). Also in this case, therefore, the umbilical member 7 is prevented from contacting and rubbing the second wrist element 12. Further, the umbilical member 7 is not separated from the body of the robot and does not swing during the motion of the robot from the first orientation to the third orientation.

According to the managing structure of the first embodiment, the umbilical member may be arranged along the second wrist element, thereby the umbilical member may follow, in a stable action, the motion of the wrist axis of the robot, without widely projecting from the forearm of the robot. Therefore, interference between the umbilical member and a peripheral object may be advantageously avoided.

When a motion range of the wrist axis of the robot is relatively narrow due to the application of the robot, the umbilical member may be retained in almost same shape. In this case, as the umbilical member may always be moved along the guide plate, the umbilical member may suffer less fatigue, resulting in a longer life of the umbilical member. Further, when the motion range of the wrist axis of the robot is wide such that the umbilical member is moved wider than the width of the guide plate, the umbilical member does not interfere with the second wrist element.

FIGS. 4a and 4b are a front view showing a total configuration of an industrial robot including a managing structure for an umbilical member of a second embodiment of the invention and a right-side view showing around a wrist of the robot, respectively. As shown in FIGS. 4a and 4b, numeral 1 denotes a handling robot of six degree-of-freedom controlled by a robot controller 2. A work tool H attached to an end of a wrist of the robot is a hand having suckers, similarly to that of the first embodiment.

Numeral 3 denotes an external air delivery/suction device. An air tube 31 connected to the device 3 is joined in place to a cable 21 for supplying a power and an electric signal to the robot and is connected to a solenoid valve box 4. Delivery and suction of air between the solenoid valve box 4 and the hand H may be carried out by means of a tube or an umbilical member 7. The robot controller 2 may control the air delivery/suction device 3 and the solenoid valve box 4 in a known manner, thereby delivery (grip-OFF) and suction (grip-ON) of air to and from the suckers of the hand H may be alternately changed.

The robot 1 has a forearm 10 and a first wrist element 11 is mounted to the forearm 10 and is rotatable about a first axis A extending in the longitudinal direction of the forearm. A second wrist element 12 is mounted to the first wrist element 11 and is rotatable about a second axis B generally perpendicular to the first axis A. Further, a third wrist element 13 is mounted to the second wrist element 12 and is rotatable about a third axis C2 generally perpendicular to the second axis B. A guide plate G similar to that of the first embodiment is attached to a side of the second wrist element 12 by a suitable means (a screw or an adhesive). An attached portion G2 of the guide plate G is near an end of the guide plate close to the work tool H.

As described above, the guide G is formed from a flexible material and has a width parallel to the second axis B. Also, the guide plate G extends away from the work tool H along the longitudinal direction generally parallel to the third axis C2 and terminates at a free end G1. The thickness of the guide plate G gradually reduces from a suitable position (for example, at or near the attached portion G2) to the free end G1.

A front surface (i.e., a surface opposite to the second wrist element 12) of the guide plate G provides a guide surface G3 which contacts and guides the umbilical member 7. Due to the guide surface G3, the umbilical member 7, extending from the solenoid valve box 4 near the base of the forearm 10 to the work tool H, elastically contacts the guide surface G3 near the free end G1 without widely projecting from the body of the robot 1. The umbilical member 7 then is guided along the longitudinal direction of the guide plate G and is connected to the work tool H. In addition, when the guide surface G3 has a low friction surface formed by a low friction material such as Teflon (TM), the umbilical member 7 may be smoothly moved on the guide surface G3. Further, when a clamp 8 for slidably holding the umbilical member 7 on the guide plate G is arranged on an upper part (i.e., at or near the free end G1) of the guide plate G, the motion of the umbilical member may be more stable. These advantages may be the same as the first embodiment.

Although the guide surface G3 of the guide plate G may be a flat surface as shown in FIG. 6a, a guide plate G' having a concave surface G3' generally at center of the guide plate G' may also be used, as shown in FIG. 6b, thereby a guide function in the width direction of the guide plate is provided. Such a concave surface may be configured on all or a part of the length of the guide plate along the longitudinal direction of the guide plate.

The constitution of the second embodiment described above may basically be the same as that of the first embodiment. The major difference between the first and second embodiments is the manner of supporting the work tool H.

That is to say, in the second embodiment, the work tool H is rotatably supported about a fourth axis C3 which is different from the third axis C2 and is generally perpendicular to the second axis B. Further, a transmission is provided for converting the rotational motion about the third axis C2 to the rotational motion of the fourth axis C3. Due to the above constitution, even though the umbilical member 7 is twisted by the rotation of the final axis, the umbilical member 7 is not swung about the third axis C2.

Figure 5:
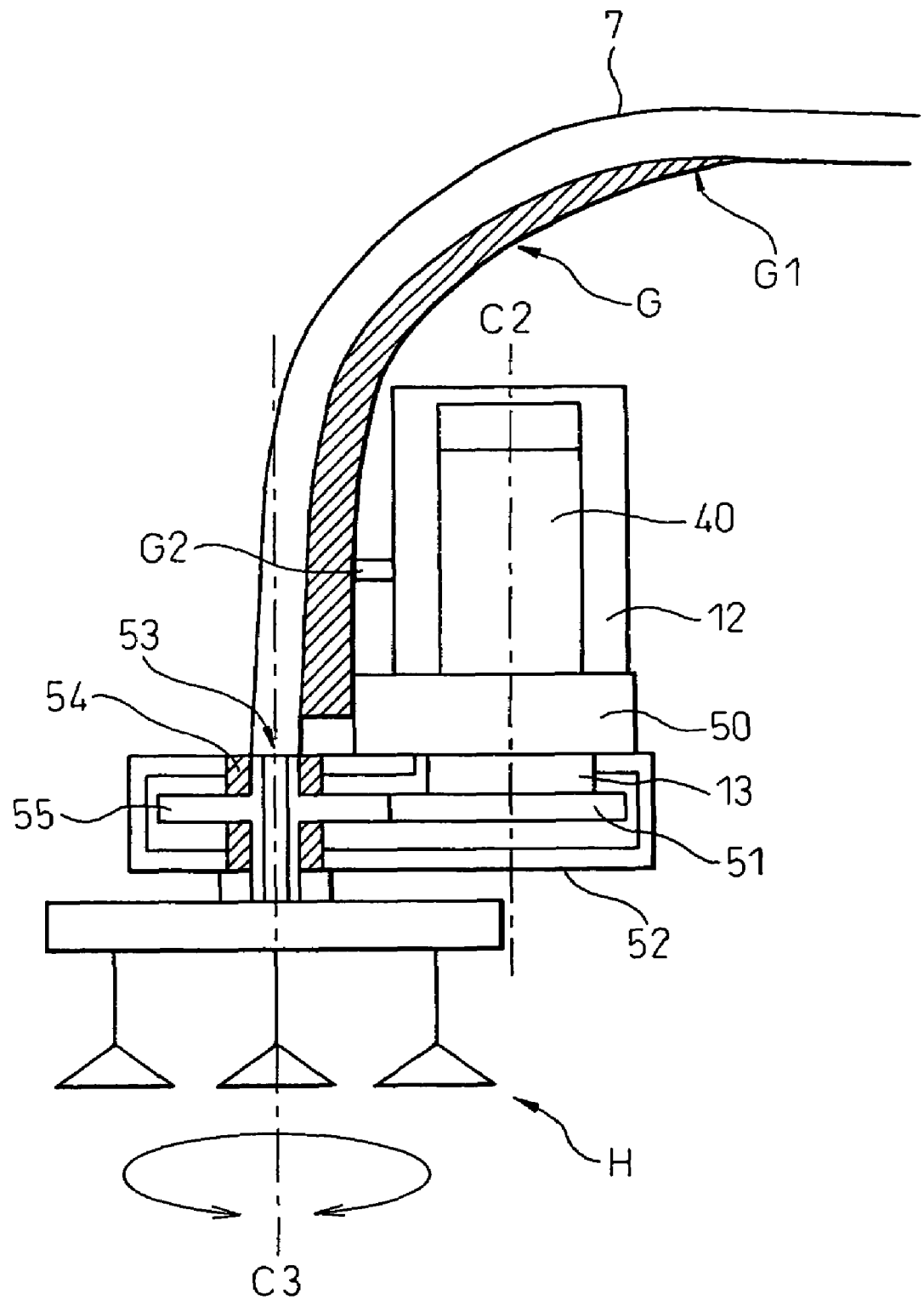
FIG. 5 is an enlarged sectional view of an example of a configuration including a transmission for converting a rotation of the third axis of the robot to a rotation of the work tool.

FIG. 5 is an enlarged sectional view of the example of the configuration of the wrist of the robot including the above transmission. As shown, numeral 40 denotes a servomotor and numeral 50 denotes a speed reduction mechanism. The speed reduction mechanism 50 has an input and an output coupled to an output axis of the servomotor 40 (not shown) and the third wrist element 13, respectively. The servomotor 40 and the speed reduction mechanism 50 are mounted in the second wrist element 12. The servomotor 40 is a servomotor for driving the final axis of the robot and is configured to rotate the third wrist element 13 about the third axis C2.

In the second embodiment, the rotational motion of the third wrist element 13 about the third axis C2 is converted to the rotational motion about the fourth axis C3, different from the third axis C2, by means of a gear mechanism, so as to rotate the work tool H. The gear mechanism has an input gear 51 and an output gear 55 engaging with the input gear 51. Numeral 52 denotes a gear box, fixed to the second wrist element 12, for containing the input and output gears 51 and 55. The gear box 52 may be fixed to another element fixed to the second wrist element 12, such as an enclosure of the servomotor 40 or the speed reduction mechanism 50. An end of the third wrist element 13 (or an output flange of the robot) is coupled to the input gear 51. Therefore, when the servomotor 40 is activated, the input gear 51 is driven via the speed reduction mechanism 50 and the third wrist element 13.

On the other hand, the work tool H includes a cylindrical portion having a bore 53. The cylindrical portion is rotatably supported by a bearing 54 about the fourth axis C3 and is integrally connected to the output gear 55. Therefore, as described above, when the servomotor 40 is activated to drive the input gear 51, the output gear 55 is correspondingly driven so as to rotate the work tool H about the fourth axis C3 extending through the bore 53. In addition, although the bearing 54 is fixed to the second wrist element 12, the bearing 54 may be fixed to another element fixed to the second wrist element 12, such as the enclosure of the servomotor 40 or the speed reduction mechanism 50, or, the gear box 52.

As described above, in the second embodiment, by means of the servomotor 40 (a drive motor for the sixth axis of the robot in this case) at the end of the second wrist element 12, the rotation of the output flange of the third wrist element 13 is controlled via the speed reduction mechanism 50. Further, the rotation of the third wrist element 13 is transmitted to the work tool H via the input and output gears 51 and 55.

Therefore, the orientation of the work tool H about the fourth axis C3 may be freely changed according to the command from the robot controller 2. The rotational direction in this case (clockwise or counter-clockwise) may also be freely changed corresponding to the rotational direction of the servomotor 40. A reduction ratio between the input and output gears 51 and 55 may be determined, as a design matter, in consideration of a rotational speed, a torque and a reduction ratio of the speed reduction mechanism 50, required of the work tool H. In addition, although this embodiment includes the gear mechanism for transmitting the rotational force, it is obvious that another mechanism for transmitting the rotational force, such as a mechanism using a belt and a pulley, may be used.

Also, although the fourth axis C3 is apart from and parallel to the third axis C2 in this embodiment, this constitution is merely a typical example and may be appropriately modified. For example, depending on an application of the robot, it is advantageous that the fourth axis C3 is somewhat inclined relative to the third axis C2. In this case, input and output gears, configured to engage with each other such that the rotational axes of the gears incline relative to each other, may be used to transmit the rotational motion of the input gear to the output gear.

In the second embodiment, even when the final axis of the robot is widely moved (i.e., the orientation of the work tool H about the fourth axis C3 is widely changed), the work tool H does not revolve about the third axis C2 and the end of the umbilical member 7 near the work tool H is stably held. The umbilical member 7 may be somewhat twisted but an extra length, to absorb the twisting, may be previously given to the umbilical member. Alternatively or additionally, a structure for rotating the umbilical member may be arranged between the work tool H and the umbilical member 7. Therefore, it is not necessary to widely project the umbilical member as prior art (see FIG. 1). Further, although the umbilical member 7 may swing somewhat due to the motions about the first and second axes A and B, the umbilical member cannot be disorderly moved, because the umbilical member contacts the guide surface of the guide plate G and is guided by the guide surface, as described above.

Further, in the second embodiment, different from the first embodiment, the work tool is rotatably supported about the fourth axis which is different from the third axis. The work tool is attached to the third wrist element via the transmission for converting the rotational motion of the third wrist element about the third axis to the rotational motion of the fourth axis. When the final axis of the robot (or the axis for rotating the third wrist element about the third axis) is activated, the rotational motion thereof is converted to the rotational motion of the work tool about the fourth axis. Therefore, the umbilical member may be twisted, however, the umbilical member is not swung about the third axis. As a result, even when the final axis of the robot is widely moved, the umbilical member may be constantly positioned on the guide plate and the umbilical member may be prevented from being damaged even when a motion range of the final axis of the robot is relatively wide.

As another aspect of the invention, FIGS. 7a and 7b show an example of an arc welding robot including the managing structure of the invention. The configuration and the effect of the example may be almost the same as those of the embodiment shown in FIG. 4. However, in the example, a wire feeder 61 for feeding a wire or an umbilical member is slidably mounted on the forearm 10. In this case, the guide plate G can bend corresponding to the position of the wire feeder 61, thereby the motion of the umbilical member 7 may be more stable. The same effect may be obtained when the wrist element 12 is rotated. Further, when the first wrist element 11 is rotated, the guide plate G can bend in the rotational direction of the first wrist element, thereby the same effect may be obtained.

As described above, according to the invention, even when the axis (in particular, the final axis) of the robot is widely moved, the umbilical member for the work tool does not widely project from the forearm of the robot and moves stably. Therefore, an effect may be obtained in which the umbilical member does not interfere with a peripheral object and the life of the umbilical member may be extended.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. An industrial robot comprising:
   a forearm;
   a first wrist element mounted to the forearm and rotatable about a first axis extending in the longitudinal direction of the forearm;
   a second wrist element mounted to the first wrist element and rotatable about a second axis generally perpendicular to the first axis;
   a third wrist element mounted to the second wrist element and rotatable about a third axis generally perpendicular to the second axis;
   a work tool attached to the third wrist element via a transmission for converting a rotational motion of the third wrist element about the third axis to a rotational motion of the work tool about a fourth axis which is generally perpendicular to the second axis and is different from the third axis, an umbilical member being connected to the work tool;
   an umbilical member managing structure including a guide plate arranged on the second wrist element, the guide plate including:
      a width extending generally parallel to the second axis;
      a free end on one side of the guide plate away from the work tool, the free end extending along the longitudinal direction perpendicular to the direction of the width;
      a flexible portion extending toward the free end; and
      a guide surface elastically contacting and guiding the umbilical member such that the extending direction of the umbilical member generally coincides with the longitudinal direction of the guide plate before the umbilical member, extending from a base of the forearm, is connected to the work tool,
   wherein the umbilical member extends above the second wrist element, is held by a clamp arranged on the guide plate slideably in the longitudinal direction of the guide plate, and is arranged along the upper and front sides of the second wrist element.

2. The industrial robot as set forth in claim 1, wherein the flexible portion of the guide plate has a thickness gradually reducing toward the free end.

3. The industrial robot as set forth in claim 1, wherein the flexible portion of the guide plate has a constant thickness toward the free end.

4. The industrial robot as set forth in claim 1, wherein the guide surface has little friction.

5. The industrial robot as set forth in claim 1, wherein the guide plate has a concave guide surface on at least a part of the guide plate along the longitudinal direction of the guide plate.

* * * * *